April 10, 1951  B. T. GROBOWSKI  2,548,721
LAWN MOWER
Filed Jan. 29, 1949  3 Sheets-Sheet 1

INVENTOR.
Benny T. Grobowski.
BY
Corbett, Mahoney & Miller
ATTORNEYS

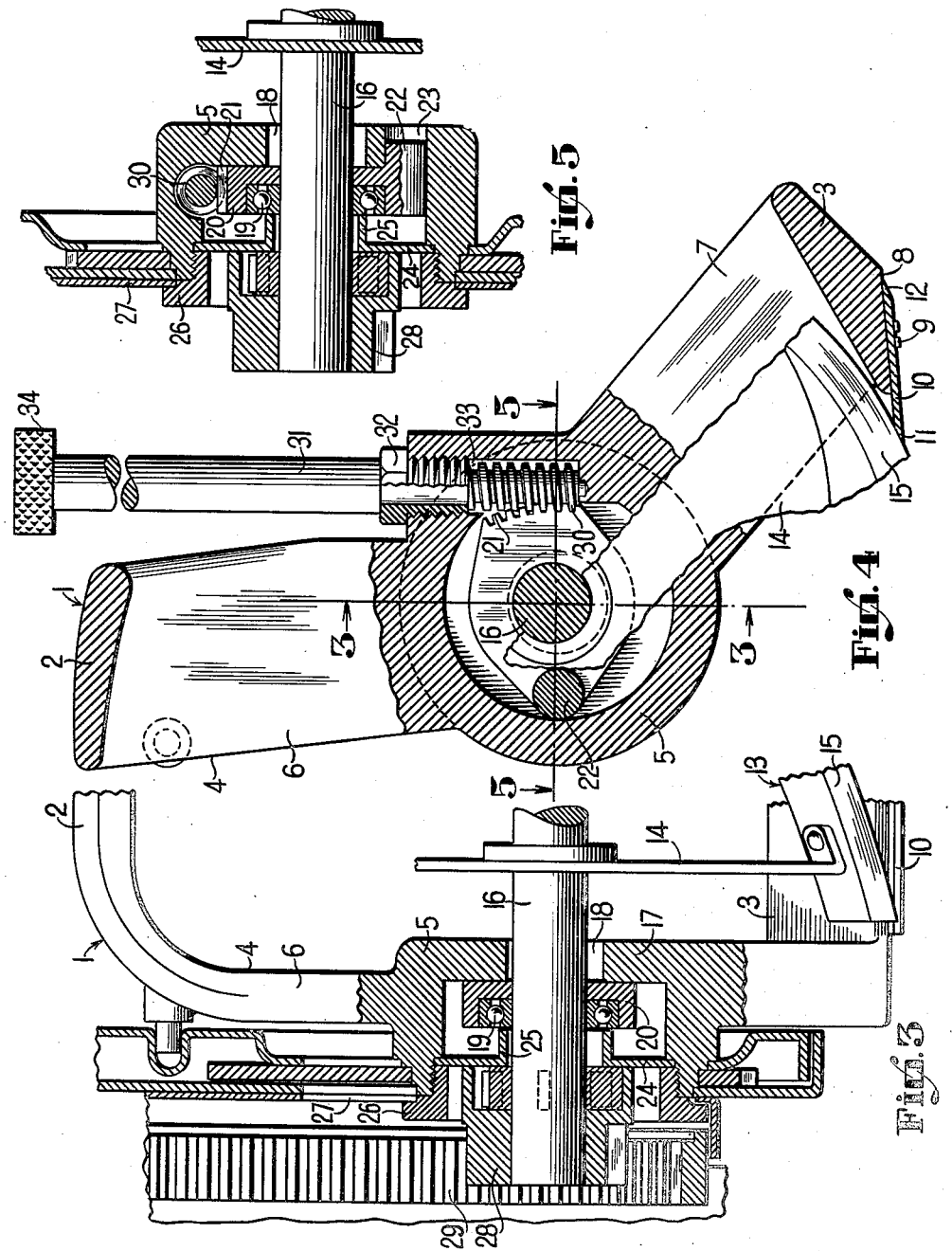

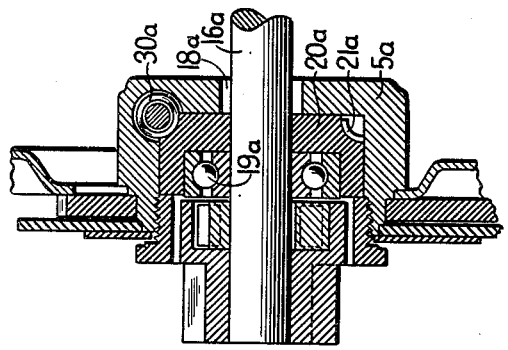
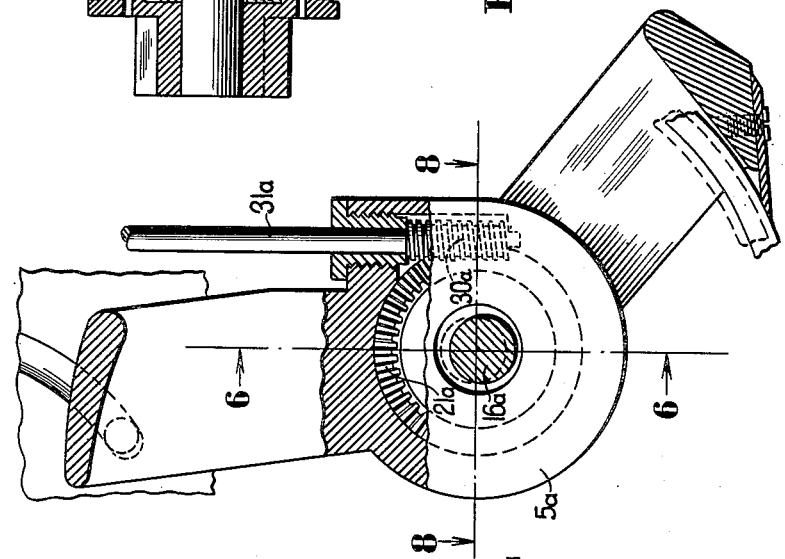
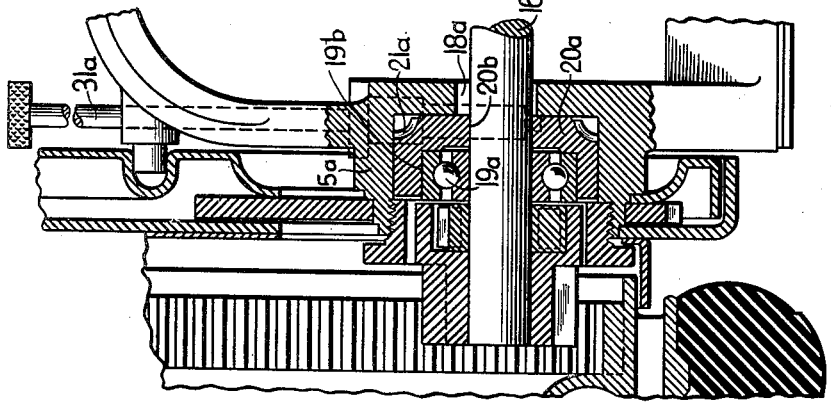

Patented Apr. 10, 1951

2,548,721

UNITED STATES PATENT OFFICE 2,548,721

LAWN MOWER

Benny T. Grobowski, Newark, Ohio, assignor to The E. T. Rugg Company, Newark, Ohio, a corporation of Ohio Application January 29, 1949, Serial No. 73,504

4 Claims. (Cl. 56—294)

My invention relates to a lawn mower. It has to do, more particularly, with the supporting structure for the cutter reel and associated cutter bar of the mower and with means for adjusting the cutter reel relative to the cutter bar to obtain the proper shearing action.

This application is a continuation-in-part of my co-pending application, now Patent No. 2,513,310 which issued on July 4, 1950.

One of the objects of my invention is to provide a lawn mower wherein the cutting reel and cooperating cutter bar are both supported by the same rugged frame unit so that there will be no danger of relative displacement or distortion during operation of the mower.

Another object of my invention is to provide a simple, effective and easily operable structure in a lawn mower for adjusting the cutting reel accurately relative to the cutter bar so as to obtain a proper shearing action, such adjustment being accomplished without the use of tools.

Various other objects will be apparent hereinafter.

According to my invention, I provide a lawn mower in which extreme rigidity is accomplished by providing a transversely extending yoke or frame unit which supports both the cutting reel and the cutter bar in rigid association with each other. The cutter bar is rigidly carried on the bottom portion of the yoke or frame slightly rearwardly of the axis of the reel and removably carries a knife which preferably has forward and rearward cutting edges and can be reversed readily so that either edge can be used. The cutting reel is provided with the usual shaft which is supported in bearings, carried by the vertical arms of the yoke, so that its axis is substantially parallel to the cutter bar. For accurately adjusting the knives of the cutting reel relative to the knife carried by the cutter bar, an adjustable eccentric structure is associated with the bearing provided at each end of the cutting reel shaft. Each of these eccentric structures may be actuated easily and quickly by means of a worm and gear structure associated therewith which may be actuated by a rotatable knob conveniently located. Adjustment of the eccentric structures will move the cutting reel shaft vertically and laterally relative to the cutter bar and, consequently, the cutting knives of the cutting reel will be adjusted accurately relative to the knife carried by the cutter bar. Furthermore, either end of the cutting reel shaft may be adjusted independently of the other. Due to the provision of the worm and gear in each of the end adjustment structures, the structure will be self-locking.

The preferred embodiment of my invention is illustrated in the accompanying drawings wherein similar characters of reference designate corresponding parts and wherein:

Figure 3 is a detailed view in vertical section showing the cutting reel bearing and adjusting structure, the view being taken substantially along line 3—3 of Figure 4.

Figure 4 is an enlarged detailed view partly in section and partly in elevation taken substantially along line 4—4 of Figure 2.

Figure 5 is a sectional view taken substantially along line 5—5 of Figure 4.

Figure 6 is a view similar to Figure 3 but showing a different eccentric adjusting structure, this view being taken substantially along line 6—6 of Figure 7.

Figure 7 is a view similar to Figure 4 but showing the adjusting structure of Figure 6.

Figure 8 is a sectional view taken along line 8—8 of Figure 7.

Figure 1:
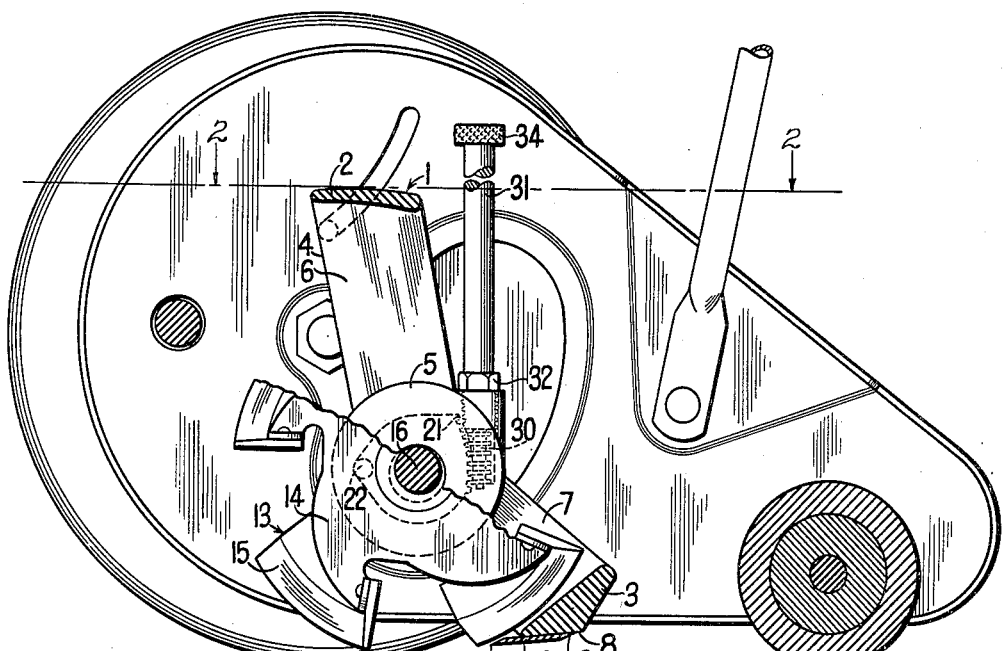
Figure 1 is a view partly in section and partly in elevation taken towards the side wheel of a mower in which my invention is embodied.

With reference to the drawings, I have illustrated my invention incorporated in a lawn mower which is of the type disclosed in detail in my Patent No. 2,513,310. This mower includes a one-piece frame unit 1 which may be termed a yoke. This yoke 1 is rigidly formed in one-piece, preferably by casting, and includes a top bar 2, a bottom cutter bar 3 and vertically disposed connecting side arms 4 of which only one is shown. The bars 2 and 3 extend transversely substantially the full width of the mower and are integrally joined to the arms 4 at the ends thereof. The arms 4 have bearing cups 5 formed thereon and these cups have their interiors machined properly to receive the bearing units to be described later. The upper portion 6 of each arm 4 extends substantially vertically above the bearing cup 5 while the lower portion 7 of each arm is inclined rearwardly. As shown best in Figure 4, the cutter bar 3 is provided with a lower flat surface 8, which is substantially horizontally disposed and against which is secured by means of a plurality of longitudinally spaced clamping screws 9, a cutter knife 10. The knife 10 is provided with a forward cutting edge 11 and a rearward cutting edge 12 and can be reversed readily so that either edge can be used.

Figure 2:
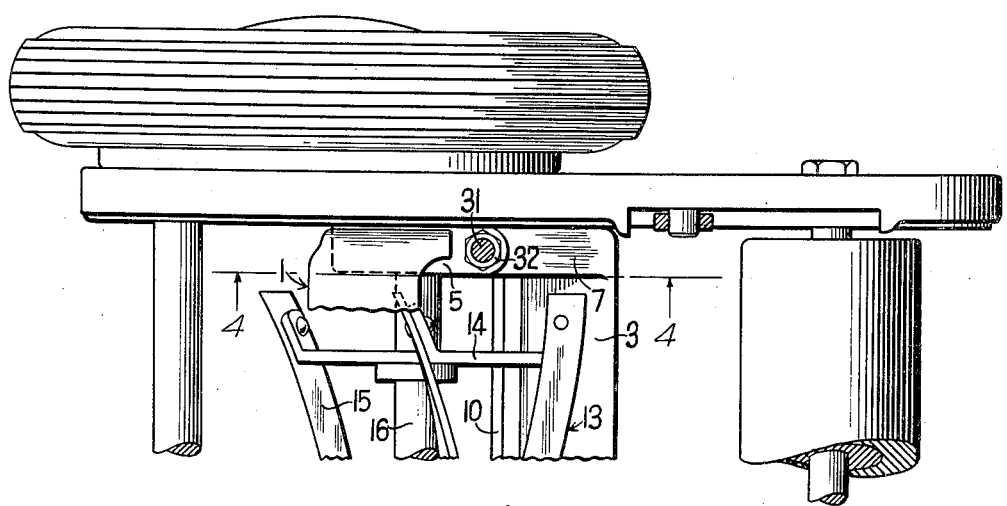
Figure 2 is a top plan view taken substantially along line 2—2 of Figure 1.

The yoke 1 supports a cutting reel 13 which is illustrated best in Figure 2 and which is of usual construction. This reel 13 includes the spiders 14 which carry the curved reel cutter knives 15. The spiders 14 are carried by a shaft 16, the ends of which extend into the bearing cups 5. Although I have illustrated only one end of the yoke 1 and the associated bearing cup 5, it is to be understood that both ends are identical.

In Figures 3 to 5, inclusive, I have illustrated one form of eccentric structure for adjusting the ends of the cutting reel shaft 16. I have illustrated the adjusting means at one end of the shaft only but it is to be understood that identical adjusting means is provided at the opposite end of the shaft. An inner vertical wall 17 is provided on the bearing cup 5 and has an enlarged opening 18 formed therein substantially at the center thereof through which the shaft 16 extends into and through the bearing cup. This opening 18 is sufficiently large to permit the necessary movement of the shaft laterally of its axis. The shaft 16 is supported in the cup 5 by means of a ball bearing 19 which is carried by a gear segment 20 which is disposed within the cup 5. This gear segment 20 is provided with an opening in alignment with the bearing 19, through which the shaft extends, and with a socket in which the bearing 19 is disposed. The rear edge of the gear segment 20 is provided with gear teeth 21, as shown in Figure 4, and its forward edge is provided with a transversely extending pivot 22. As shown best in Figure 5, this pivot 22 is integral with the gear segment and extends laterally inwardly into a socket 23 provided in the end wall 17 of the bearing cup 5. Thus, the segment 20 is pivoted to the cup 5 at a point substantially diametrically opposed to the rear edge segment 21. It will be noted from Figure 4 that the segment 20 is substantially smaller in vertical dimension than the diameter of the cup 5 so as to permit swinging vertical movement of the member 20 in the cup 5 about the pivot 22.

The bearing 19 and the gear segment 20 are held in position by a thrust collar 24 which is inserted in the bearing and which has a collar portion 25 engaging the bearing. This collar 24 is held in position by a nut 26 threaded into the outer end of the bearing 5. This clamping nut 26 is used for clamping side plates 27 and associated parts to the mower frame as described in my Patent No. 2,513,310. Also, as indicated in such patent, the shaft 16 carries a pinion 28 on its outer end which engages the internal gear 29 of the mower wheel.

For moving each gear segment 20 about its pivot 22, a worm 30 is provided. This worm is carried on the lower end of a vertically disposed shaft 31 which is rotatably mounted in a bearing sleeve 32 threaded into the upper end of the socket member 33 which is disposed tangentially relative to the bearing cup 5. The worm 30 meshes with the gear teeth 21 of segment 20 as indicated. It will be apparent that by rotating shaft 31 with knob 34, which is keyed on the upper end thereof, the segment 20 may be swung around pivot 22. This will move the shaft 16 within the opening 18 and will adjust the cutting reel relative to the cutter bar. Furthermore, the adjusting mechanism will be automatically locked due to the provision of the worm and gear arrangement. It will be apparent that the movement of the end of the shaft is relatively small and the pinion 28 will continue to engage the gear 29.

It will be apparent that either end of the shaft 16 can be adjusted independently of the other by actuating the proper knob 34 which is conveniently located well above the frame 1. Furthermore, to accomplish this adjustment no tools are required. This adjustment will move the entire cutting reel 13 vertically so that the knives 15 thereof may be adjusted closely relative to the knife 10 carried by the cutter bar. Thus, either end of the cutting reel may be adjusted independently of the other with precision.

In Figures 6, 7 and 8, I have illustrated a modified eccentric structure for adjusting each end of the cutting reel structure. In this structure an adjustable eccentric 20a is mounted in the bearing cup 5a and carries a ball bearing 19a. The eccentric is rotatably disposed in the cup 5a and has an outer cylindrical surface for fitting therein. This eccentric has an eccentrically disposed socket 19b for receiving the bearing 19a. The end of the shaft 16a extends through the enlarged opening 18a at the inner side of a cup 5a which is of sufficient size to permit the necessary vertical and lateral movement of the shaft. The shaft fits rotatably but tightly in an opening 20b formed in member 20a eccentrically thereof. The shaft passes centrally through the ball bearing 19a. Thus, it will be apparent that when the eccentric 20a is rotated, the shaft will be moved in such a manner that its axis moves vertically and laterally of the bearing cup 5a.

To rotate the eccentric 20a and produce the movement of the shaft 16a, the eccentric has a worm gear portion 21a formed thereon at its inner side. This portion 21a is engaged by a worm 30a which is formed on the lower end of a vertical shaft 31a as shown in Figure 7. The shaft 31a is mounted and actuated in the same manner as the shaft 31 previously referred to.

Thus, this mechanism will be actuated in substantially the same manner as the previously described adjusting mechanism. Rotation of the eccentrics 20a will produce the desired movement of the shaft 16a to adjust the cutting reel relative to the cutting knife.

It will apparent from the above description that I have provided novel means for supporting the cutting reel and cutting bar and novel means for adjusting the cutting reel relative to the cutting knife.

Having thus described my invention, what I claim is:

1. A mower comprising a rigid frame, said frame comprising vertically spaced transverse members and connecting side members joined together, the lower transverse member being provided with a bed knife, a cutting reel disposed on a shaft, bearing members pivotally supported by said side members, said shaft being journaled in said bearing members of said pivotal support, and adjusting means interconnecting said side members and said bearing members for moving said bearing members so that the reel is adjusted with respect to said bed knife.

2. A structure according to claim 1, wherein the reel shaft is supported by said pivotally mounted bearing members in intermediate relationship to said pivot and reel adjusting means.

3. A structure according to claim 2, wherein said reel adjusting means is located at each side of the mower, said bearing member also having a rear edge provided with gear teeth and a forward edge provided with a transversely extending pivot and a worm gear engaging said gear teeth